US006851613B2

(12) United States Patent
Yoshii

(10) Patent No.: US 6,851,613 B2
(45) Date of Patent: Feb. 8, 2005

(54) CARD PROCESSOR

(75) Inventor: Masahiro Yoshii, Shiga (JP)

(73) Assignee: Omron Corporation (JP)

( * ) Notice: Subject to any disclaimer, the term of this patent is extended or adjusted under 35 U.S.C. 154(b) by 0 days.

(21) Appl. No.: 10/699,644

(22) Filed: Nov. 4, 2003

(65) Prior Publication Data

US 2004/0094628 A1 May 20, 2004

(30) Foreign Application Priority Data

Nov. 19, 2002 (JP) ....................................... 2002-335296

(51) Int. Cl.[7] ............................................. G06K 13/04

(52) U.S. Cl. ....................... 235/479; 235/475; 235/480; 235/481; 271/3.17

(58) Field of Search ................................ 235/475, 479, 235/480, 481; 271/3.14, 3.15, 3.16, 3.17, 3.18, 265.02, 285

(56) References Cited

U.S. PATENT DOCUMENTS 5,624,107 A * 4/1997 Deguchi et al. ............. 271/3.2
6,460,771 B1 10/2002 May
6,494,364 B2 * 12/2002 Shepherd .................... 235/379

FOREIGN PATENT DOCUMENTS

EP 1 067 474 1/2001

OTHER PUBLICATIONS

J. Svigals, "Unauthorized Card Stripe Reading Inhibitor" IBM Technical Disclosure Bulletin, vol. 26, No. 6, pp. 2707, Nov. 1983.

* cited by examiner

*Primary Examiner*—Diane I. Lee
*Assistant Examiner*—Lisa M. Caputo
(74) *Attorney, Agent, or Firm*—Dickstein Shapiro Morin & Oshinsky LLP

(57) ABSTRACT

A card processor which maintains security against unauthorized reading of the magnetic data recorded in the card and improves operability by suppressing offensive feeling to the customers includes a card carriage control unit which rotates carrier rollers in a direction in which a card is taken in by the interior of the main body until the card is held by the pair of carrier rollers closest to the insertion port. Therefore, the customer who inserts the card does not receive offensive feeling such as supporting something with the card that occurs when the leading end of the card comes in contact with the carrier rollers that are halting. As the card is held by the carrier rollers, further, the card carriage control unit intermittently carries the card so as to be taken in by the main body. Even in case an unauthorized card reader is attached to the front surface of the insertion port, therefore, the card data are not read out without authorization.

8 Claims, 7 Drawing Sheets

*1*

DIRECTION IN WHICH CARD IS TAKEN IN
10
11
12
13
14
15
16
17
18
21
22
23
24

10
11
12
13
14
15
16
17
18
21
22
23
24
DIRECTION IN WHICH CARD IS TAKEN IN
UNAUTHORIZED CARD READER

CARD PROCESSOR

CROSS-REFERENCE TO RELATED APPLICATIONS

This application claims foreign priority to Japanese application 2002-335295, filed 19 Nov. 2002.

BACKGROUND OF THE INVENTION

1. Field of the Invention

This invention relates to a card processor for reading the card data recorded in a card inserted in a main body thereof through an insertion port. More particularly, the invention relates to a card processor having an unauthorized read-preventing function for preventing the unauthorized reading of the card data recorded in the card inserted in the main body.

2. Description of Related Art

Various apparatuses such as an Automatic Teller Machine (ATM), a Cash Dispenser (CD) and the like devices installed in the banks have heretofore been furnished with a card processor for reading the magnetic data (card data) recorded in the card. A magnetic head of the card processor is brought into contact with the magnetic recording surface (magnetic stripe) of the card to read the magnetic data that are recorded therein while the card inserted in the main body through the insertion port is being carried therein.

However, the magnetic data of a card which a customer inserts into the card processor can be read without authorization, as described below. An unauthorized card reader having a magnetic head and a memory can be attached to the front surface of the card insertion port of the card processor. The unauthorized card reader is arranged so that a card insertion port is formed in the front surface thereof, and a card inserted through the front surface passes through the interior of the main body and is discharged through the back surface. The magnetic data recorded in the card passing through the main body is read by the magnetic head of the unauthorized card reader, and stored in a memory.

A customer may insert his card through the card insertion port of the unauthorized card reader without knowing that the unauthorized card reader has been attached to the front surface of the card processor. Then, the card passes through the unauthorized card reader and is taken in by the interior of the main body from the card insertion port of the card processor. At this moment, the magnetic data recorded in the customer's card are read without authorization by the unauthorized card reader.

The card processor, on the other hand, reads the magnetic data recorded in the magnetic card while carrying the card that is introduced through the insertion port of the main body irrespective of whether the magnetic data of the card have been read by the unauthorized card reader. The card processor, then, processes the transaction by using the magnetic data that are read out. Thereafter, the card processor discharges the card that is taken in by the main body, the card passes through the unauthorized card reader, and is returned back to the customer. In this way, the unauthorized card reader is capable of reading the magnetic data recorded in the card without authorization when the card is being discharged from the card processor.

The customer finds that the transactions have been normally processed by using his card, and does not perceive that the magnetic data had been read by the unauthorized card reader. A person who has attached the unauthorized card reader removes the unauthorized card reader from the card processor, and can now forge the card by using the card data stored in the memory.

In order to cope with the unauthorized reading of the magnetic data, there have so far been proposed a technology (see Svigals J: "Unauthorized Card Stripe Reading Inhibitor", IBM TECHNICAL DISCLOSURE BULLETIN, Vol. 126 No. 6, Nov. 1, 1983 (1983-11-1), page 2707, XP002145300, New York) in which the card is intermittently carried while the card is partly exposed out of the main body such as when the card is being taken in by the main body or is discharged, and a technology (see U.S. Pat. No. 6,460,771B1) which intermittently carries the card in a random fashion in order to enhance the security.

In the conventional card processor, however, the carrier rollers for holding and carrying the card are intermittently rotated (rotated and stopped repetitively) when the card is inserted by the customer. Therefore, it often happens that the customer inserts the card when the carrier rollers are halted.

Usually, the carrier roller are made of a material having a high frictional force to reliably carry the card. With the carrier rollers being at rest when the card is inserted, therefore, the leading end of the card comes in contact with the carrier rollers that are at rest to temporarily hinder the customer's operation for inserting the card. At this moment, foreign matter in the insertion passage of the card causes offensive feeling to the customer, such as supporting something with the card.

As the carrier rollers start rotating, further, the card that is inserted is taken in by the main body being supported by the carrier rollers. Therefore, the card is smoothly inserted making a complete change from the feeling of supporting something, which, still, is offensive feeling for the customer.

As described above, the conventional card processor is provided with only a countermeasure which is for enhancing the security against unauthorized reading of the magnetic data recorded in the card, but no measure has been taken for suppressing the offensive feeling for the customer and, hence, the operability is not favorable.

SUMMARY OF THE INVENTION

It is an object of the present invention to provide a card processor which maintains security against unauthorized reading of the magnetic data recorded in the card and improves operability by suppressing offensive feeling to the customers.

According to one aspect of the present invention, the card processor of the present invention includes a card carrier passage in which a plurality of pairs of carrier rollers are arranged in a direction in which a card is carried being held, a card carriage controller for controlling the carriage of card on the card carrier passage by controlling the rotation of the carrier rollers, and a card data reader for reading the card data recorded in the card that is carried along the card carrier passage. The card carriage controller rotates the carrier rollers in a forward direction in which the card is carried into the interior of the main body until the card inserted in the card carrier passage through an insertion port is held by a pair of carrier rollers closest to the insertion port. After the card is held by the pair of carrier rollers closest to the insertion port, the carrier rollers are rotated in the forward direction and stopped repetitively, so that the card is taken in by a predetermined length by the main body. After the card is taken in by the predetermined length by the main body, the carrier rollers are rotated forward to carry the card up to a storage portion in the main body. The card carriage controller rotates the carrier rollers in a direction (forward direction) in which the card is taken in by the interior of the main body until the card is held by the pair of carrier rollers closest to the insertion port in the card carrier passage. When the customer inserts the card, the leading end of the card does not comes in contact with the carrier rollers that are halting, and therefore the customer does not feel something offensive, such as the card lodging in something.

Further, when the card is held by the pair of carrier rollers closest to the insertion port in the card carrier passage, the card carriage controller repeats the rotation and stop of the carrier rollers to intermittently carry the card. Therefore, even if an unauthorized card reader is attached to the front surface of the insertion port of the card processor, the card data are not read by the unauthorized card reader, and security is maintained against the unauthorized reading of the magnetic data recorded in the card.

Then, as the card is taken in by the main body by a predetermined length, for example, as the card is taken in until a portion of the card is not exposed to the outer side, the card carriage controller rotates the carrier rollers in the forward direction to carry the card at nearly a constant speed up to the storage portion in the main body. The card data recorded in the card is read while the card is being carried at a constant speed, suppressing the occurrence of error in reading the card data.

The present invention therefore maintains security against unauthorized reading of the magnetic data recorded in the card while improving operability by suppressing an offensive feeling to the customers.

According to another aspect of the present invention, when the card is held by the pair of carrier rollers closest to the insertion port in the card carrier passage, the card carriage controller rotates the carrier rollers in the forward direction and in the reverse direction repetitively to repetitively carry the card in a direction in which it is taken in by the interior of the main body and in a direction in which it is discharged out of the main body, so that the card is taken in by a predetermined length by the main body. For example, the card is taken in until a portion of the card is not exposed to the outer side. While the card is partly exposed to the outer side of the main body, the card is repetitively carried in the direction in which it is taken in by the interior of the main body and in the direction in which it is discharged out of the main body. This further enhances the security against the unauthorized reading of the card data by the unauthorized card reader attached to the front surface of the insertion port of the card processor.

According to yet another aspect of the present invention, when the card is held by the pair of carrier rollers closest to the insertion port in the card carrier passage, the card is taken in by a predetermined length by the main body while varying the rotational speed of the carrier rollers. The card is taken in by the predetermined length by the main body while varying the carrying speed of the card. When the magnetic data recorded in the card are to be read out by the magnetic head, an electromotive force generated by the magnetic head decreases with a decrease in the speed of carrying the card. Therefore, if the speed for carrying the card is decreased to some extent, it becomes difficult to read the magnetic data recorded in the card even though the carriage of the card is not completely halted. Therefore, this enhances the security against the unauthorized reading of the card data by the unauthorized card reader attached to the front surface of the insertion port of the card processor.

According to yet another aspect of the present invention, a first sensor for detecting the card is provided for the pair of carrier rollers closest to the insertion port on the side of the insertion port. When the card is detected by the first sensor, the card carriage controller starts rotating the carrier rollers in the forward direction. Therefore, the carrier rollers are not wastefully and continuously rotated when there is no customer.

According to yet another aspect of the present invention, a second sensor for detecting the card is provided for the pair of carrier rollers closest to the insertion port but on the side opposite to the insertion port. When the card is detected by the second sensor, the card carriage controller determines that the card is held by the pair of carrier rollers. The card is held by the pair of carrier rollers arranged closest to the insertion port side when the card is detected by the second sensor provided neighboring the pair of carrier rollers closest to the insertion port but on the side opposite to the insertion port.

Alternatively, both the first and second sensors are provided. When the card is detected by the first sensor, the card carriage controller starts rotating the carrier rollers in the forward direction. When the card is detected by the second sensor, the card carriage controller concludes that the card is held by the pair of carrier rollers, and when the card is not detected by the first sensor but is detected by the second sensor, the card carriage controller concludes that the card has been taken in by a predetermined length by the main body.

According to yet another aspect of the present invention, when the card is being held by the pair of carrier rollers closest to the insertion portion at the time when the card is being discharged, the card carriage controller rotates the carrier rollers in a direction in which the card is discharged and stops repetitively, so that the card is discharged from the main body by a predetermined length to prevent the unauthorized reading of the card data by the unauthorized card reader.

According to yet another aspect of the present invention, when the card is being held by the pair of carrier rollers closest to the insertion portion at the time when the card is being discharged, the card carriage controller rotates the carrier rollers in a direction in which the card is discharged and in a direction in which the card is taken in by the main body, repetitively, so that the card is discharged from the main body by a predetermined length, in order to prevent the unauthorized reading of the card data by the unauthorized card reader.

In accordance with yet another aspect of the present invention, when the card is discharged from the main body by a predetermined length at the time of discharging the card, the card carriage controller rotates the carrier rollers in the direction in which the card is discharged, thereby permitting the card to be returned to the customer without producing an offensive feeling.

BRIEF DESCRIPTION OF THE DRAWINGS

The foregoing and other advantages and features of the invention will become more apparent from the detailed description of exemplary embodiments of the invention given below with reference to the accompanying drawings, in which:

FIGS. 5A, 5B, 5C, and 5D, shows a view illustrating changes in the state at the time of take in;

FIGS. 7A, 7B, 7C, and 7D, shows a view illustrating changes in the state at the time of discharge.

DETAILED DESCRIPTION OF A PREFERRED EMBODIMENT OF THE INVENTION

A card processor according to an embodiment of the invention will now be described.

Figure 1:
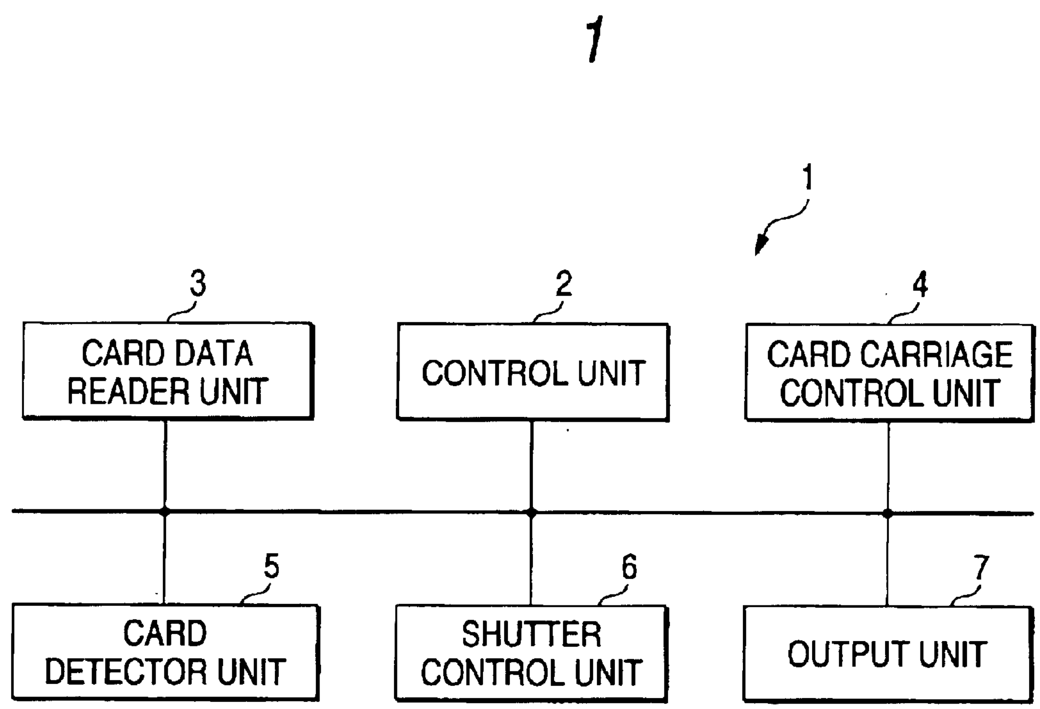
FIG. 1 shows a block diagram illustrating the constitution of a card processor according to an embodiment of the invention.

FIG. 1 is a block diagram illustrating a card processor according to an embodiment of the invention. The card processor 1 of this embodiment includes a control unit 2 for controlling the operation of the main body, a card data reader unit 3 for reading the card data recorded in the card inserted in the main body, a card carriage control unit 4 for controlling the carriage of the card inserted in the main body, a card detector unit 5 for detecting the presence of the card in the carrier passage, a shutter control unit 6 for controlling the opening/closing of the shutter provided in the insertion port, and an output unit 7 for producing the card data read from the card inserted in the main body.

Figure 2:
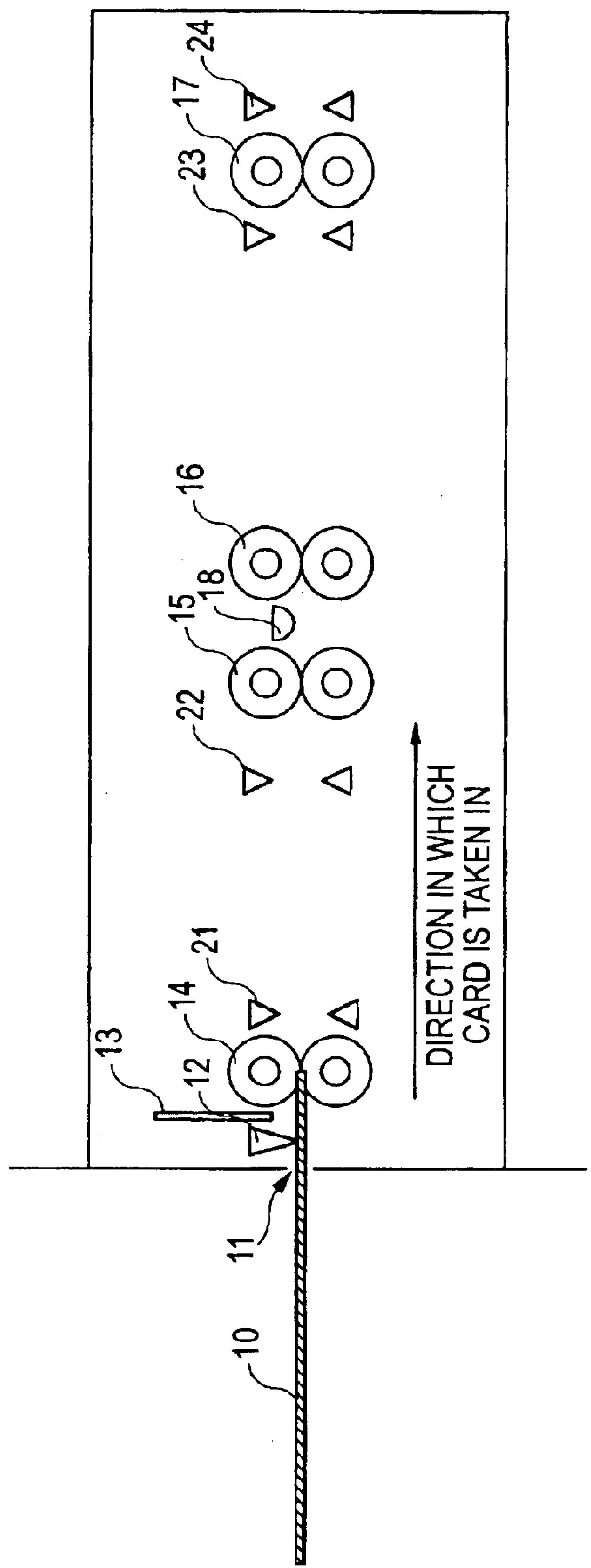
FIG. 2 shows a view schematically illustrating the internal constitution of the card processor according to the embodiment of the invention.

FIG. 2 is a view schematically illustrating the internal structure of the card processor according to the embodiment of the invention. The card processor 1 of this embodiment is incorporated in such apparatuses as ATM, CD and the like. In FIG. 2, reference numeral 10 denotes a card, and 11 denotes an insertion port for inserting the card 10. The insertion port 11 is positioned in the front surface of the apparatus to which the card processor 1 is applied. Reference numeral 12 denotes a sensor (corresponding to the first sensor referred to in the summary of the invention) for detecting the insertion of the card 10. The sensor 12 is a push sensor which is located at a position where it is pushed by the card 10 that is inserted. Reference numeral 13 denotes a shutter. The open/closed state of the insertion port 11 is controlled by the shutter control unit 6.

Reference numerals 14 to 17 denote pairs of carrier rollers for holding and carrying the card, which are arranged in a direction in which the card 10 is carried. The carrier rollers 14 are a pair of carrier rollers closest to the insertion port, that is referred to in the invention. Among the pairs of carrier rollers 14 to 17, those on one side are drive rollers to which the rotational force of a motor is transmitted, and those on the other side are driven rollers that rotate following the drive rollers. The carrier rollers 14 to 17 are driven by a single motor. The card carriage control unit 4 controls the rotation of the motor (inclusive of the rotational direction and rotational speed) and the stop thereof. Reference numerals 21 to 24 denote sensors for detecting the presence of the card on the carrier passage. The sensors 21 to 24 are optical sensors comprising light-emitting units and light-receiving units, which are arranged facing each other with the carrier passage interposed therebetween. The sensor 21 corresponds to the second sensor referred to in the summary of the invention. The sensor 21 is constituted to detect the card 10 that is held by the carrier rollers 14 closest to the insertion port 11. The sensor 24 is for detecting the card 10 that is inserted in the main body and that has reached the storage portion. Based on the results detected by the sensors 12 and 21 to 24, the card detector unit 5 detects the card 10 that is inserted in the main body and the position of the card 10 on the carrier passage. Reference numeral 18 denotes a magnetic head for reading the magnetic data recorded in the card 10 inserted in the main body. The magnetic head 18 is connected to the card data reader unit 3.

The length from the insertion port 11 until the sensor 21 is about one-third (e.g., about 30 mm) of the length (e.g., about 86 mm) of the card 10 in the direction in which it is carried. The length from the sensor 12 to the magnetic head 18 (e.g., about 90 mm) is slightly longer than the length of the card 10 in the direction in which it is carried.

The card 10 is a magnetic card recording the card data (magnetic data) in the magnetic stripe formed on the surface of the card 10. The card 10, however, may also be a composite card having an IC chip recording the card data in addition to the magnetic stripe. In this case, the main body of the card processor 1 may be provided with a contact point which can be electrically connected to the IC chip of the card 10 that is carried into the storage portion to read the card data recorded in the IC chip.

Figure 3:
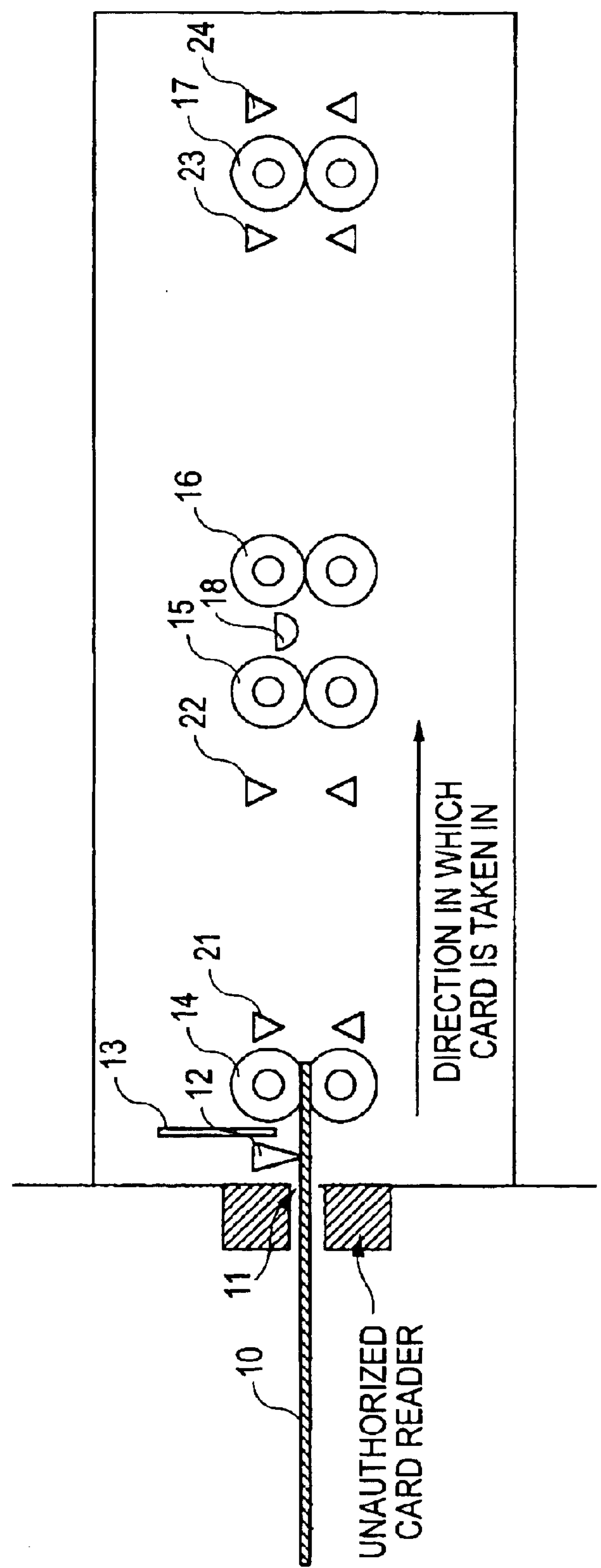
FIG. 3 shows a view schematically illustrating a state where an unauthorized card reader is attached to the card processor of the embodiment of the invention.

Referring to FIG. 3, an unauthorized card reader is attached to the front surface of the insertion port 11. When the unauthorized card reader is attached, the card is taken in by the main body passing through the unauthorized card reader and the insertion port 11. The unauthorized card reader is provided with a magnetic head and a memory.

Figure 4:
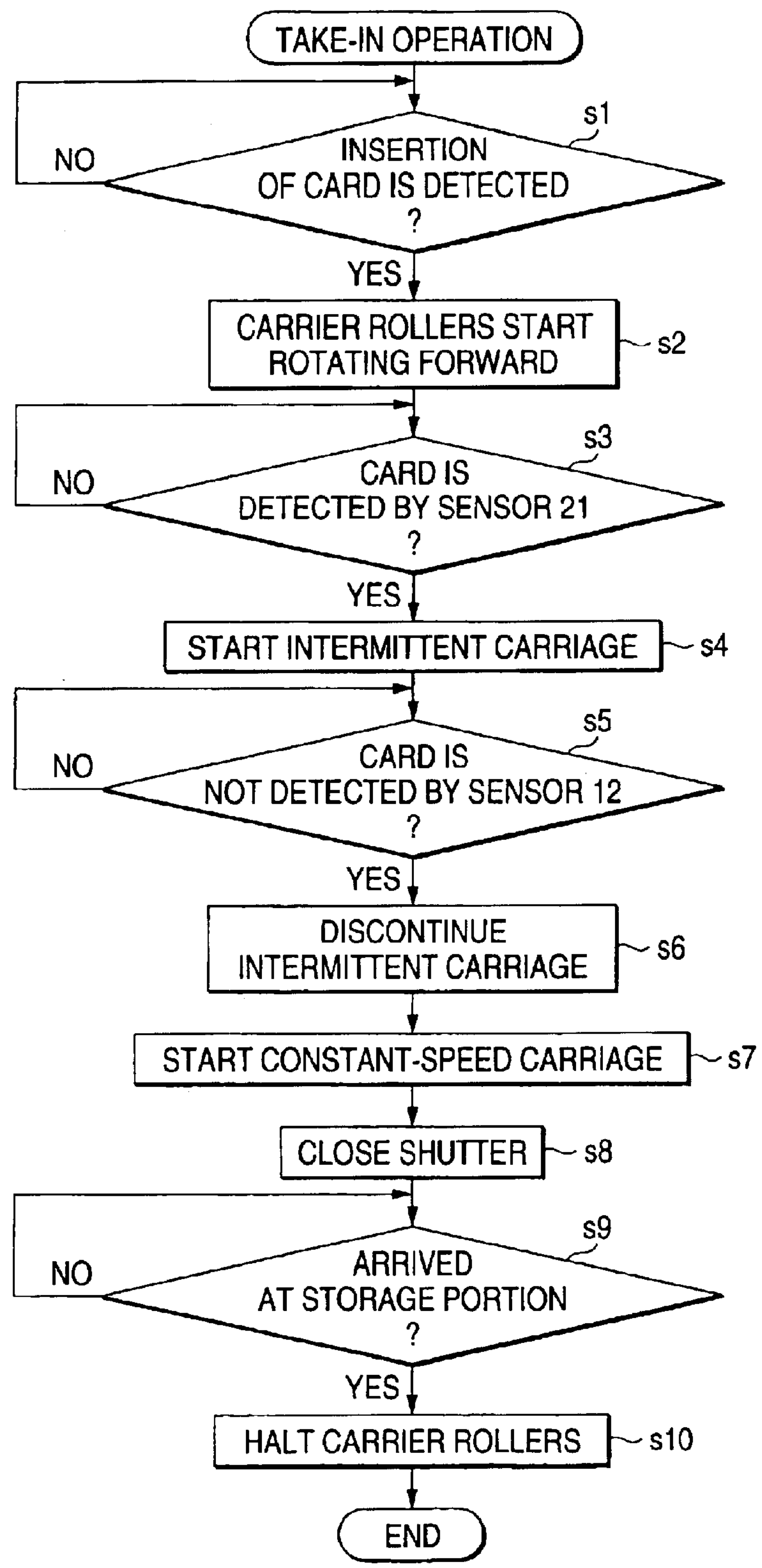
FIG. 4 shows a flowchart illustrating the take-in operation.

The operation of the card processor according to the embodiment will be described next. First, described below is the operation (take-in operation) for taking in the card by the main body through the insertion port 11. FIG. 4 is a flowchart illustrating the take-in operation.

Figure 5:
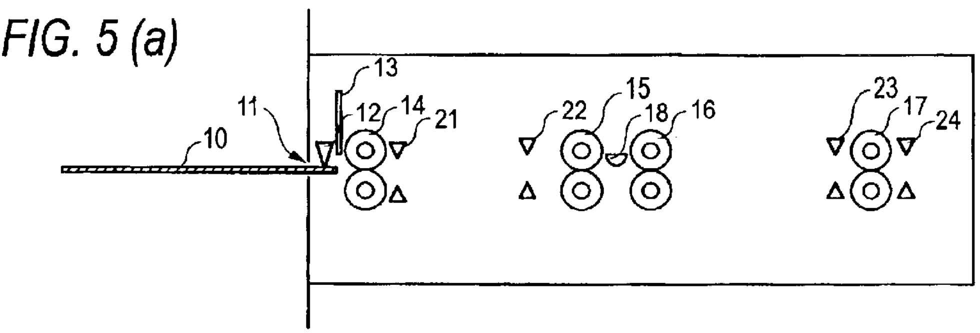
FIG. 5, comprising
Figure 5:
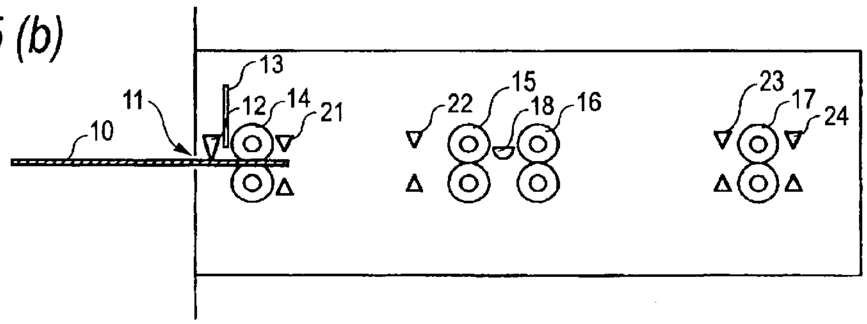
Figure 5:
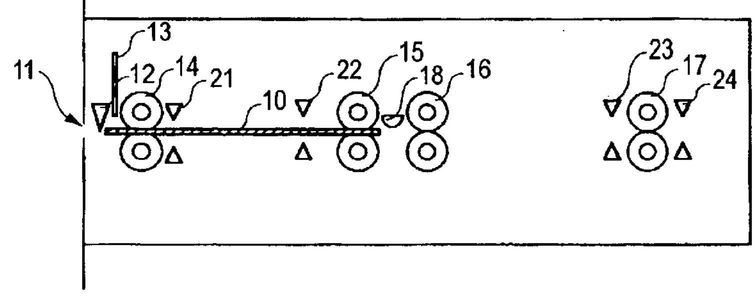
Figure 5:
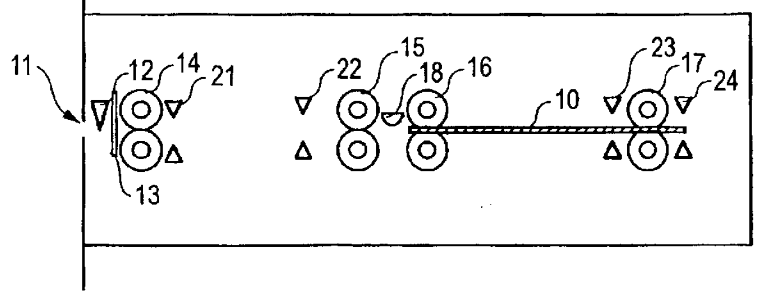

When the card 10 inserted in the main body is detected by the sensor 12 (s1)(see FIG. 5(*a*)), the carrier rollers 14 to 17 in the card processor 1 start rotating in the forward direction (i.e., direction in which the card 10 is taken in by the interior of the main body)(s2). At s2, the card carriage control unit 4 controls the rotation of the motor (not shown) to rotate the carrier rollers 14 to 17 in the forward direction.

The carrier rollers 14 to 17 in the card processor 1 are halted until the insertion of the card is detected at s1. Further, the shutter 13 is not closed the insertion port 11, and the customer is not prevented from inserting the card 10.

As the card 10 is further pushed into the main body by the customer beyond the state shown in FIG. 5(*a*), the leading end of the card 10 enters into between the pair of carrier rollers 14 (carrier rollers closest to the insertion port 11). At this moment, the carrier rollers 14 are rotating forward. Therefore, the card 10 can be smoothly inserted in the main body and no offensive feeling is given to the customer. As the leading end of the card 10 is held by the carrier rollers 14 and is detected by the sensor 21 disposed neighboring the carrier rollers 14 (on the side opposite to the insertion port 11)(s3)(see FIG. 5(*b*)), the card 10 is intermittently carried (s4).

The intermittent carriage starts at a timing when the leading end of the card 10 is detected by the sensor 21. Therefore, the intermittent carriage starts at a timing while the card 10 is being exposed to the outer side by about two-thirds from the insertion port 11.

The intermittent carriage that starts at s4 will now be described. The intermittent carriage referred to here is the operation for carrying the card 10 (so as to be taken in by the main body) by rotating the carrier rollers 14 to 17 forward for a first period of time (e.g., 20 ms) and, then, discontinuing the operation for a second period of time (e.g., 40 ms), repetitively. The card 10 is taken in by the main body while being repetitively carried and halted. The speed for carrying the card during the first period of time is, for example, 100 mm/s.

As is well known, in order to read the magnetic data recorded in the magnetic stripe, the magnetic head must be continuously moved relative to the magnetic stripe. If the magnetic head comes into a halt relative to the magnetic stripe while the magnetic data are being read, no data will be read while the head is halted. Therefore, even if the unauthorized card reader is attached to the front surface of the insertion port 11, the above intermittent carriage starts when the magnetic data recorded in the magnetic stripe of the card 10 are read nearly by half by the unauthorized card reader. Accordingly, the magnetic data recorded in the latter half of the magnetic stripe of the card 10 are not read by the unauthorized card reader.

In recording the magnetic data, in general, the enciphered data are recorded in the former half portion or in the latter half portion of the magnetic stripe, and a key for decoding is recorded in the other half portion. Therefore, even if the magnetic data recorded in the former half portion of the magnetic stripe are read out, it is not allowed to utilize the magnetic data without authorization.

The card processor 1 continues the intermittent carriage that starts at s4 until the card 10 is no longer detected by the sensor 12 (s5)(see FIG. 5(*c*)). When the rear end of the card 10 is located inside the main body beyond the sensor 12, the card 10 is no longer detected by the sensor 12. When the card 10 is no longer detected by the sensor 12 (when the card 10 is completely taken in by the interior of the main body of the card processor 1), the card processor 1 discontinues (s6) the intermittent carriage that has started at s4, and starts the constant-speed carriage to carry the card 10 at a constant speed (s7). When the constant-speed carriage starts at s7, the leading end of the card 10 is not yet arriving at the magnetic head. Due to the constant-speed carriage, the card 10 is carried at a speed of, for example, about 300 mm/s.

When the constant-speed carriage starts at s7, the card processor 1 closes the shutter 13 (s8) so that another card 10 will not be inserted through the insertion portion 11. After the constant-speed carriage, the magnetic stripe of the card 10 comes in contact with the magnetic head 18 in the card processor 1. In the card processor 1, the magnetic head 18 reads the magnetic data recorded in the magnetic stripe of the card 10 that is carried at a constant speed.

When the card 10 that has arrived at the storage portion is detected (s9)(see FIG. 5(*d*)), the card processor 1 discontinues the carriage of the card (carrier rollers are halted)(s10) to end operation for taking in the card (see FIG. 5(*d*)). When the leading end of the card 10 is detected by the sensor 24, the card processor 1 concludes that the card 10 has arrived at the storage portion.

When the card 10 has arrived at the storage portion, the rear end of the card 10 has already passed through the magnetic head 18 as shown in FIG. 5(*d*), and the card processor 1 can read the magnetic data recorded in the card 10.

The card processor 1 outputs the magnetic data read from the card 10 taken in by the main body through an output unit 7. The magnetic data are used by the apparatus to which the card processor 1 is adapted. For example, the magnetic data are used for the transaction processing in the ATM or the CD.

Figure 6:
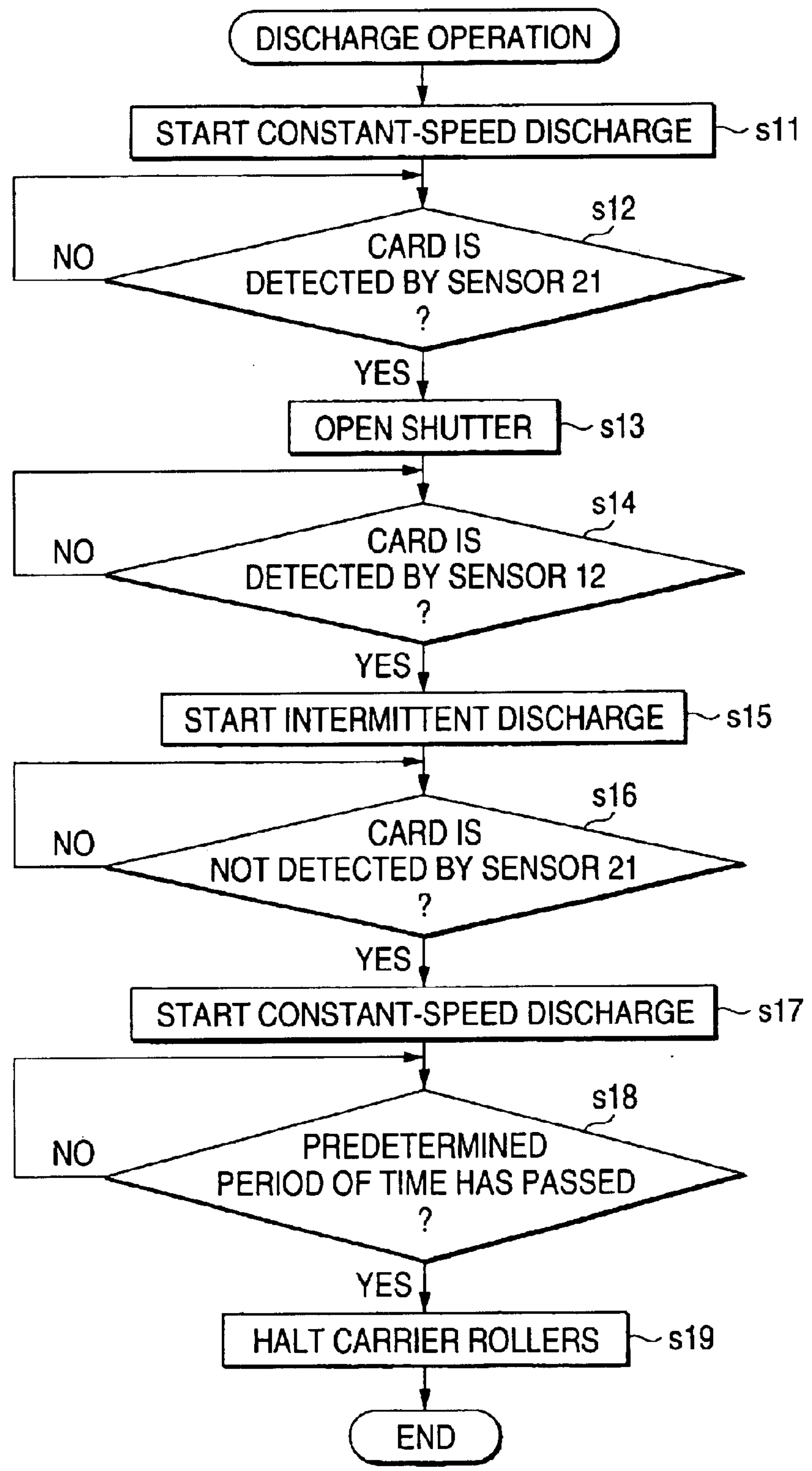
FIG. 6 shows a flowchart illustrating the discharge operation.
Figure 7:
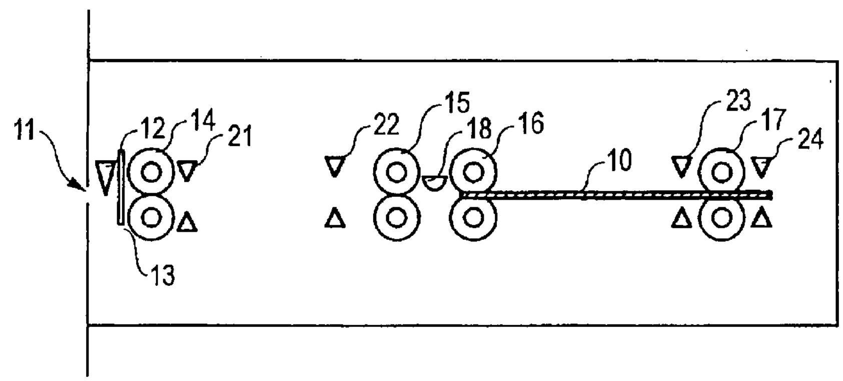
FIG. 7, comprising
Figure 7:
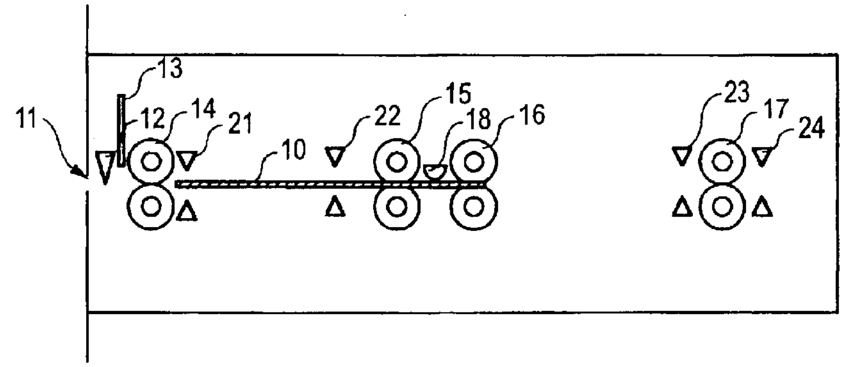
Figure 7:
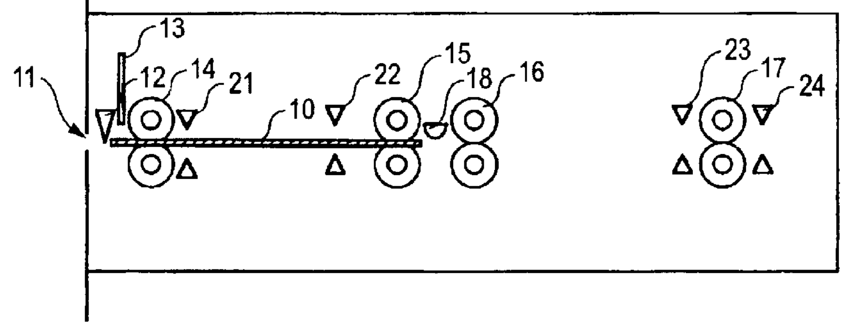
Figure 7:
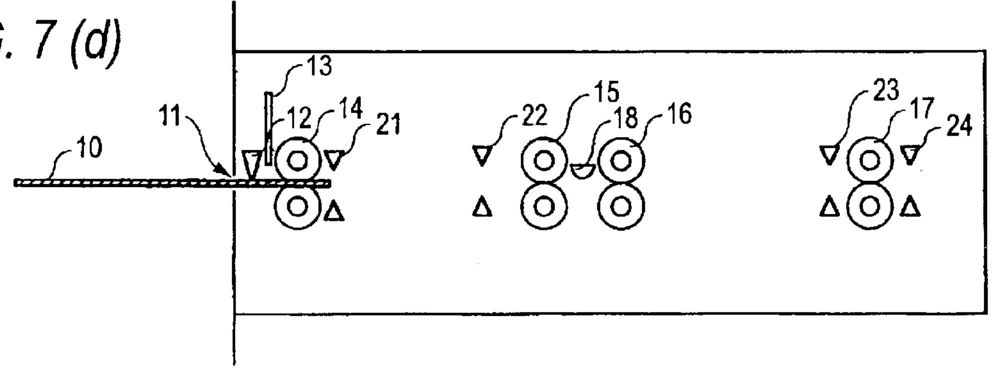

Next, described below is the operation for discharging the card 10 to return back to the customer the card 10 that is carried to the storage portion. FIG. 6 is a flowchart illustrating the discharge operation. The card processor 1 carries (starts discharging at a constant speed) the card 10 at the storage portion in the direction of discharge at a constant speed of, for example, 300 mm/s (s11)(see FIG. 7(*a*)). At this moment, the carrier rollers 14 to 17 are rotated by the card carriage control unit 4 in a direction (reverse direction) in which the card 10 is discharged. When the card 10 is detected by the sensor 21 (s12), the card processor 1 opens the shutter 13 (s13)(see FIG. 7(*b*)). At this moment, the constant-speed carriage of the card 10 is continuing in the direction in which the card 10 is discharged. When the sensor 12 detects the card 10 (when the leading end of the card 10 arrives at the sensor 12)(s14)(see FIG. 7(*c*)), the card processor 1 starts the intermittent discharge (s15).

The intermittent discharge at s15 is the operation for discharging the card 10 by rotating the carrier rollers 14 to 17 in the reverse direction for a third period of time (e.g., 20 ms) and then discontinuing the operation for a fourth period of time (e.g., 40 ms), repetitively. The card 10 is discharged from the main body while being repetitively carried and halted. The speed for carrying the card during the third period of time is, for example, 100 mm/s. At the start of the intermittent discharge, the whole card 10 is located in the main body (no portion is exposed to the outer side).

As the intermittent discharge starts at s15, the card processor 1 continues the intermittent discharge until the card is no longer detected by the sensor 21 (s16). When the card is no longer detected by the sensor 21 (when the card 10 is positioned on the side of the insertion port 11 beyond the sensor 21)(see FIG. 7(*d*)), the card 10 has been discharged through the insertion port 11 by about two-thirds. Accordingly, even if the unauthorized card reader is attached to the front surface of the insertion port 11, the unauthorized card reader cannot read the magnetic data recorded in the magnetic stripe of the card 10 discharged from the main body by the intermittent discharge operation. Besides, the magnetic data recorded in this portion are those data that were not read by the unauthorized card reader through the take-in operation described above.

When the card 10 is no longer detected by the sensor 21, the card processor 1 rotates the carrier roller 14 in the reverse direction at a constant speed for a predetermined period of time and, then, halts the carrier rollers to end the processing (s17 to s19). Then, the customer pinches the card 10 that is partly discharged from the insertion port 11 and pulls it out from the main body. Here, since the carrier rollers 14 are rotating in the reverse direction, the customer is allowed to take out the card 10 from the main body without offensive feeling.

In the card processor 1 of this embodiment as described above, the magnetic data are not read without authorization by the unauthorized card reader attached to the front surface of the insertion port 11 at the time of inserting the card 10 into the main body and discharging the card from the main body. When the customer is pinching the card 10 that is inserted through the insertion port 11, the carrier rollers 14 are rotating forward and no offensive feeling is given to the customer. Further, when the customer pinches the card 10 discharged from the insertion port 11 to pull it out, the carrier rollers 14 are rotating reverse and the customer does not feel it offensive. Therefore, this makes it possible to maintain security against unauthorized reading of the magnetic data recorded in the card 10 and to improve operability for the customer.

In the operation for taking in the card 10 that is inserted through the insertion port 11 according to the above embodiment, the card 10 is taken in by the main body by the intermittent carriage while repeating the carriage of the card 10 and stop while the card 10 is being detected by the two sensors 12 and 21 (processing at s4). It is, however, also allowable to take in the card by the main body while repeating the carriage and stop in the direction in which the card 10 is taken in by the main body and repeating the carriage and stop in the direction of discharge. For example, the card 10 may be taken in by the main body by repeating the operation consisting of carrying the card 10 in the direction of being taken in by the main body for 20 ms, halting the carriage for 40 ms, carrying the card 10 in the direction of being discharged from the main body for 5 ms, and halting the carriage for 40 ms. This makes it possible to more reliably prevent the magnetic data recorded in the card 10 from being read out without authorization by the unauthorized card reader attached to the front surface of the insertion port 11.

Similarly, in the operation for discharging the card 10, too, it is allowable to discharge the card 10 from the main body by repeating the carriage and stop in the direction in which the card 10 is discharged from the main body and repeating the carriage and stop in the direction in which it is taken in while the card 10 is being detected by the two sensors 12 and 21. For example, the card 10 may be discharged from the main body by repeating the operation consisting of carrying the card 10 in the direction of discharge from the main body for 20 ms, halting the carriage for 40 ms, carrying the card 10 in the direction of being taken in by the main body for 5 ms, and halting the carriage for 40 ms. This makes it possible to more reliably prevent the magnetic data recorded in the card 10 from being read out without authorization by the unauthorized card reader attached to the front surface of the insertion port 11.

It is further allowable to take in the card 10 by the main body while varying the speed for carrying the card 10 instead of completely halting the carriage of the card 10 while the two sensors 12 and 21 are detecting the card 10. When the magnetic data recorded in the card are to be read by the magnetic head 18, an electromotive force generated by the magnetic head 18 decreases with a decrease in the speed of carrying the card 10. Therefore, if the speed for carrying the card 10 is decreased to some extent, it becomes difficult to read the magnetic data recorded in the card 10 though the carriage of the card 10 is not completely halted. Therefore, this prevents the magnetic data recorded in the card 10 that is taken in from being read out without authorization by the unauthorized card reader attached to the front surface of the insertion port 11. Besides, since the carriage of the card 10 is not completely halted, it is allowed to shorten the time in which the two sensors 12 and 21 are detecting the card 10 and, as a result, the processing time can be shortened.

According to the present invention as described above, the card data recorded in the card are prevented from being read out without authorization by an unauthorized card reader attached to the front surface of the insertion port and, besides, the operability is improved without giving offensive feeling to the customer at the time of inserting or discharging the card.

What is claimed is:

1. A card processor comprising:

a card carrier passage comprising a plurality of pairs of carrier rollers, said plurality of pairs of carrier rollers being arranged to hold a card being carried in said passage and said plurality of pairs of carrier rollers including at least a first pair of carrier rollers and a second pair of carrier rollers;

a first sensor for detecting the card, said first sensor being provided between an exterior opening of said card carrier passage and said first pair of carrier rollers;

a second sensor for detecting the card, said second sensor being provided after said first pair of carrier rollers;

a card carriage controller, responsive to said sensors, for controlling carriage of the card in said card carrier passage by controlling the rotation of said carrier rollers; and a card data reader for reading the card data recorded in the card which is carried in said card carrier passage, said card data reader being provided after said second pair of carrier rollers;

wherein when said first sensor detects the card, said card carriage controller causes said carrier rollers to rotate in a forward direction until said second sensor detects the card;

after said second sensor detects the card, the card carriage controller causes said carrier rollers to repeatedly briefly rotate in a forward direction and briefly stop, until said first sensor does not detect the card;

after said first sensor does not detect the card, the card carriage controller causes said carrier rollers to rotate forward to carry the card up to a storage portion of said card processor.

2. The card processor according to claim 1, wherein after said second sensor detects the card, the card carriage controller causes said carrier rollers to briefly rotate in a reverse direction after each stop, until the first sensor does not detect the card.

3. A card processor comprising:

a card carrier passage comprising a plurality of pairs of carrier rollers arranged to hold a card being carried in said passage;

a card carriage controller for controlling carriage of the card on said card carrier passage by controlling the rotation of said carrier rollers; and a card data reader for reading the card data recorded in the card that is carried along said card carrier passage;

wherein said card carriage controller rotates the carrier rollers in a forward direction in which the card is carried into the interior of a main body of the card processor until the card inserted in the card carrier passage through an insertion port is held by a pair of carrier rollers closest to the insertion port;

after the card is held by the pair of carrier rollers closest to the insertion port, the card is taken in by a predetermined length by the main body while varying the rotational speed of the carrier rollers and stopping said carrier rollers; and after the card is taken in by the predetermined length by the main body, the carrier rollers are rotated forward to carry the card up to a storage portion in the main body.

4. The card processor according to claim 3, further comprising:

a first sensor for detecting the card, the first sensor being provided for the pair of carrier rollers closest to the insertion port on the side of the insertion port;

wherein when the card is detected by said first sensor, said card carriage controller starts rotating the carrier rollers in the forward direction.

5. The card processor according to claim 3, further comprising:

a second sensor for detecting the card, the second sensor being provided neighboring the pair of carrier rollers closest to the insertion port but on the side opposite to the insertion port;

wherein when the card is detected by said second sensor, said card carriage controller determines that the card is held by said pair of carrier rollers.

6. The card processor according to claim 3, further comprising:

a first sensor for detecting the card, the first sensor being provided for the pair of carrier rollers closest to the insertion port on the side of the insertion port; and a second sensor for detecting the card, the second sensor being provided neighboring the pair of carrier rollers closest to the insertion port but on the side opposite to the insertion port;

wherein when the card is detected by said first sensor, said card carriage controller starts rotating the carrier rollers in the forward direction, when the card is detected by said second sensor, said card carriage controller determines that the card is held by said pair of carrier rollers, and when said card is not detected by said first sensor but is detected by said second sensor, said card carrier controller determines that the card has been taken in by a predetermined length by the main body.

7. A card processor comprising:

a card carrier passage in which a plurality of pairs of carrier rollers are arranged in a direction in which a card is carried being held thereby;

a card carriage controller for controlling the carriage of card on said card carrier passage by controlling the rotation of said carrier rollers; and a card data reader for reading the card data recorded in the card that is carried along said card carrier passage;

wherein while discharging the card, the card carriage controller rotates the carrier rollers in a discharge direction until the card passes through a pair of carrier rollers closest to an insertion portion, then the carriage controller repeatedly briefly rotates the carrier rollers in the discharge direction and stops, until the card has been discharged from a main body of the card processor by a predetermined length of the card.

8. The card processor according to claim 7, wherein when the card is discharged from the main body by a predetermined length at the time of discharging the card, said card carriage controller rotates the carrier rollers in the direction in which the card is discharged.

* * * * *